(12) United States Patent
Lord et al.

(10) Patent No.: US 7,032,664 B2
(45) Date of Patent: Apr. 25, 2006

(54) NANOCOMPOSITE PARTICULATES AND METHODS OF USING NANOCOMPOSITE PARTICULATES

(75) Inventors: David L. Lord, Marlow, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 85 days.

(21) Appl. No.: 10/859,008

(22) Filed: Jun. 2, 2004

(65) Prior Publication Data

US 2005/0272611 A1    Dec. 8, 2005

(51) Int. Cl.
*E21B 43/04*    (2006.01)

(52) U.S. Cl. .................... 166/276; 166/280.2

(58) Field of Classification Search ........... 166/278, 166/280.2
See application file for complete search history.

(56) References Cited

U.S. PATENT DOCUMENTS

| | | | | |
|---|---|---|---|---|
| 4,713,203 A | * | 12/1987 | Andrews | 264/681 |
| 6,372,678 B1 | * | 4/2002 | Youngman et al. | 501/128 |
| 6,528,157 B1 | * | 3/2003 | Hussain et al. | 428/325 |
| 2002/0132875 A1 | | 9/2002 | Stadtmueller | 523/115 |
| 2002/0143094 A1 | | 10/2002 | Conroy et al. | 524/445 |
| 2003/0099798 A1 | | 5/2003 | George et al. | 428/36.9 |

OTHER PUBLICATIONS

J. Gorman, Science News This Week, Fracture Protection—Nanotubes toughen up ceramics. www.sciencenews.com, vol. 163, p. 3, Jan. 4, 2003.

Zhan et al., UC Davis Department of Chemical Engineering, "Single-wall carbon nanotubes as attractive toughening agents in alumina-based nanocomposites," published on-line Dec. 15, 2002.

* cited by examiner

*Primary Examiner*—John Kreck
(74) *Attorney, Agent, or Firm*—Robert A. Kent; Baker Botts

(57) ABSTRACT

The present invention relates to particulate composites comprising at least one resin and at least one nanoparticle material. Some embodiments of the present invention provide methods of treating a portion of a subterranean formation comprising providing a nanocomposite particulate comprising at least one resin and at least one nanoparticle material; substantially slurrying the nanocomposite particulate into a servicing fluid to create a slurry; and, placing the slurry a well bore penetrating the portion of the subterranean formation. Other embodiments of the present invention provide nanocomposite particulates suitable for use in a subterranean application comprising at least one resin and at least one nanoparticle material wherein the nanocomposite particulate comprises from about 0.1% to about 30% nanoparticle material by weight of the nanocomposite particulate.

33 Claims, No Drawings

NANOCOMPOSITE PARTICULATES AND METHODS OF USING NANOCOMPOSITE PARTICULATES

BACKGROUND OF THE INVENTION

The present invention relates to compositions suitable for use as particulates in subterranean operations, such as proppant or gravel. More particularly, the present invention relates to particulate composites comprising at least one resin and at least one nanoparticle material.

Servicing fluids comprising particulates are used in a variety of operations and treatments performed in oil and gas wells. Such operations and treatments include, but are not limited to, production stimulation operations such as fracturing, well completion operations such as gravel packing, and combined operations such as frac-packing.

An example of a production stimulation operation using a servicing fluid having particles suspended therein is hydraulic fracturing, wherein a servicing fluid known as a fracturing fluid is pumped through a well bore into a portion of a subterranean formation at a rate and pressure such that fractures are formed and/or extended into the subterranean zone. The fracture or fractures may range from horizontal to vertical, with the latter usually predominating, and with the tendency toward vertical fracture orientation with the depth of the formation being fractured. The fracturing fluid is generally a gel, emulsion, or foam that may comprise a particulate material often referred to as proppant. Proppant may be deposited in a fracture and function, inter alia, to hold the fracture open while maintaining conductive channels through which produced fluids can flow upon completion of the fracturing treatment and release of the attendant hydraulic pressure.

An example of a well completion operation using a servicing fluid containing particulates is gravel packing. Gravel packing treatments are used, inter alia, to reduce the migration of unconsolidated formation particulates into the well bore. In gravel packing operations, particles referred to in the art as gravel are carried to a well bore in a portion of a subterranean formation by a hydrocarbon or water-based carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or may be returned to the surface after passing through a screen positioned adjacent to the productive interval. The resultant gravel pack acts as a filter to separate formation solids from produced fluids while permitting the produced fluids to flow into and through the well bore. Traditional gravel pack operations involve placing a gravel pack screen in the well bore and packing the surrounding annulus between the screen and the well bore with gravel sized to prevent the passage of formation particulates through the pack with produced fluids. The gravel pack screen is generally a filter assembly used to support and retain the gravel placed during the gravel pack operation. A wide range of sizes and screen configurations are available to suit the characteristics of a well bore, the production fluid, and any particulates in the subterranean formation. Gravel packs may be used to stabilize a portion of a formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. These treatments are often completed with a gravel pack screen assembly in place with the hydraulic fracturing treatment being pumped through the annular space between the casing/open hole and screen. In this situation the hydraulic fracturing treatment is typically designed to screen out at the fracture tip, creating a packed fracture and an annular gravel pack between the screen and casing/open hole. This allows both the hydraulic fracturing treatment and gravel pack to be placed in a single operation. In other cases the fracturing treatment may be performed prior to installing the screen and placing a gravel pack.

Servicing fluids such as fracturing fluids, gravel packing carrier fluids, and frac pack fluids, generally must be highly viscous to be able to suspend particulates. To achieve a high viscosity, viscosifiers often are added to such fluids. Such viscosifiers are expensive. Moreover, as a fracture or a gravel pack is created a portion of the liquid contained in the fluid may leak off into the formation and create a filter cake comprising deposited viscosifier on the walls of the fracture, well bore, and/or the formation.

Filter cakes are sometimes desirable to aid in preventing drilling and other servicing fluids from being lost in the formation and to prevent solids from entering the porosities of the producing formation. However, just as a filter cake may block the loss of fluids into the formation, the same filter cake may block the production of fluids from the formation. Thus, the presence of a filter cake on a producing zone is generally undesirable when a subterranean formation is returned to production. Moreover, residue of viscosifiers used in subterranean applications often remains on the particulates transported in the viscosified fluid and may reduce the conductivity of packs made from such particulates. Chemicals, referred to in the industry as "breakers," are often incorporated into the servicing fluid to minimize this problem.

Resin materials generally exhibit relatively low specific gravities and are attractive for preparing particulates that can be used in subterranean operations. Their low specific gravity allows them to be transported to the production zone with servicing fluids having reduced viscosity as compared to traditional servicing fluids that are designed to carry traditionally high specific gravity (greater than about 2.4) particulates. However, previously developed resin particulates have not exhibited sufficient mechanical properties (such as crush strength and stiffness) to enable them to be suitable for use in subterranean operations.

Recently, the automotive, medical, and aviation arts have begun to explore the use of composite materials encompassing nanoparticles. Virtually all types and classes of nanocomposites tested exhibit new and improved properties over their microparticle and larger counterparts. The mechanical properties that are often benefited include stiffness, strength, heat resistance, moisture absorption, and permeability.

SUMMARY OF THE INVENTION

The present invention relates to compositions suitable for use as particulates in subterranean operations, such as proppant or gravel. More particularly, the present invention relates to particulate composites comprising at least one resin and at least one nanoparticle material.

Some embodiments of the present invention provide methods of treating a portion of a subterranean formation comprising providing a nanocomposite particulate comprising at least one resin and at least one nanoparticle material; substantially slurrying the nanocomposite particulate into a servicing fluid to create a slurry; and, placing the slurry a well bore penetrating the portion of the subterranean formation.

Other embodiments of the present invention provide methods of fracturing a portion of a subterranean formation comprising providing a nanocomposite particulate comprising at least one resin and at least one nanoparticle material; substantially slurrying the nanocomposite particulate into a fracturing fluid to create a slurry; and, placing the slurry into a well bore penetrating the portion of the subterranean such that at least a portion of the nanocomposite particulates enter a fracture therein.

Other embodiments of the present invention provide methods of gravel packing a portion of a well bore penetrating a portion of a subterranean formation comprising providing a nanocomposite particulate comprising at least one resin and at least one nanoparticle material; substantially slurrying the nanocomposite particulate into a servicing fluid to create a slurry; and, introducing the slurry to the portion of the well bore such that at least a portion of the nanocomposite particulates form a gravel pack in or neighboring the portion of the well bore.

Other embodiments of the present invention provide nanocomposite particulates suitable for use in a subterranean application comprising at least one resin and at least one nanoparticle material wherein the nanocomposite particulate comprises from about 0.1% to about 30% nanoparticle material by weight of the nanocomposite particulate.

The features and advantages of the present invention will be readily apparent to those skilled in the art upon a reading of the description of the preferred embodiments that follows.

DESCRIPTION OF PREFERRED EMBODIMENTS

The present invention relates to compositions suitable for use as particulates in subterranean operations, such as proppant or gravel. More particularly, the present invention relates to composite particulates comprising at least one resin and at least one nanoparticle material.

The composite particulates of the present invention comprise from about 0.1% to about 30% nanoparticle material by weight of the total composite particulate. Preferably, the composite particulates of the present invention comprise from about 1% to about 20% nanoparticle material by weight of the total composite particulate. In some embodiment of the present invention, the composite particulate may further comprise particles of micro or larger size.

The composite particulates of the present invention comprise at least one resin and at least one nanoparticle material; such composite particulates may be thought of as nanocomposite particulates. For the purposes of this invention, the term "nanoparticle" refers to a particle having an average diameter of less than about 500 nanometers. In some embodiments, the average diameter of a suitable nanoparticle may be less than about 100 nanometers. While the term "diameter" is used herein to describe suitable particle sizes, it should be understood that nanoparticle materials suitable for use in the present invention need mot be substantially spherical in shape. Rather, where an ovoid, fibrous, polygonal, or other shape is used, the definition applied above may be applied such that the average length of the longest line that could theoretically be drawn to bisect the particle is less than about 500 nanometers.

When matter is reduced to a size wherein the average particle diameter is diameter of less than about 500 nanometers, it may exhibit different melting temperatures, magnetization properties, and charge capacity as compared to the same matter at a larger size. These and other physical property changes may make nanoparticle materials particularly well suited for use in forming nanocomposite particulates suitable for use in subterranean applications because such nanocomposite particulates may be harder and less brittle than composite particulates made of the same materials but using particles of greater than nanoparticle size.

Resins suitable for use in the present invention are generally thermosetting resins, thermoplastic resins, cold settling resins, and combinations thereof. Thermosetting suitable for use in the present invention may be extruded from a liquid form at an elevated temperature, then, as they cool, they harden and form into a solid material. Thermosetting resins suitable for use in the present invention include, but are not limited to, epoxy, phenolic, resole, polyester, epoxy-modified novolac, furans, melamine resins, acrylic-based resins, and combinations thereof. Some suitable examples of acrylic-based include, but are not limited to, ethyl acrylate, methyl methacrylate, n-butyl methylacryate, and mixtures thereof. Thermoplastic resins suitable for use in the present invention include, but are not limited to, polyethylene, acrylonitrile-butadiene styrene, polystyrene, polyvinyl chloride, polyvinyl benzene, fluoroplastics, polysulfide, polypropylene, styrene acrylonitrile, nylon, phenylene oxide, polyvinylbenzene, polyolefins, polystyrene divinylbenzene, polyfluorocarbons, polyethers etherketones, polyamide imides, and mixtures thereof. Cold setting resins suitable for use in the present invention include, but are not limited to, epoxy resins cured with an amine, at least one epoxy resin and at least one polyurethane cured with an amine, a polyurethane, alkine modified resole cured with an ester, and combinations thereof.

Nanoparticle materials suitable for use in the present invention generally comprise any material that is suitable for adding structural strength to the composite particulate and has an average diameter of less than about 500 nanometers. Suitable nanoparticles include, but are not limited to, nano-clays, carbon nanofibers, polyhedral oligomeric silsesquioxanes (POSS), carbon nanotubes, nanoparticle minerals (such as silica, alumina, mica, graphite, carbon black, fumed carbon, and fly ash), glass nanospheres, ceramic nanospheres, and combinations thereof.

Carbon black is a powdered form of a highly dispersed elemental carbon that may be manufactured by controlled vapor-phase pyrolysis of hydrocarbons. There are a number of different types of carbon black, produced by different industrial processes, including acetylene black, channel black, furnace black, lamp black and thermal black. Average particle diameters in several commercially-produced carbon blacks range from 0.01 to 0.4 micrometers ($\mu m$), while average aggregate diameters range from 0.1 to 0.8 $\mu m$. Most types of carbon black contain over 97 to 99% elemental carbon. Carbon blacks may also contain chemically bound hydrogen, oxygen, nitrogen and sulfur. A suitable carbon black is commercially available under trade names BLACK PEARLS, ELFTEX, VULCAN, MOGUL, MONARCH, EMPORER, REGAL, UNITED, SPHERON and STERLING, Cabot Corp., Alpharetta, Ga.

Fly ash, as referred to herein, refers to a finely divided residue resulting from the combustion of carbonaceous material, such as ground or powdered coal, and generally carried by generated flue gases. One preferred fly ash is ASTM class F fly ash, having a Blaine fineness of about 10,585 square centimeters per gram and commercially available from Halliburton Energy Services, Inc., of Houston, Tex., under the trade designation "POZMIX®." Another preferred fly ash is ASTM class C high-lime fly ash produced from combustion of low-sulfur, sub-bituminous coal that originated from the Powder River Basin near Gillette, Wyo. Low carbon, high calcium content and self-cementitious properties characterize this fly ash. In other embodiments of the present invention, the combustion product may comprise "bottom ash." Bottom ash, as referred to herein, refers to a finely divided residue resulting from the combustion of carbonaceous material and generally accumulating on the floor of an incinerator.

Polyhedral oligomeric silsesquioxanes (POSS), is a term used in the art to describe the smallest reactive particles of silica. Where a combination of nanoparticles are used to create the nanocomposite particulate, POSS may be used to take advantage of the reactive nature of the silica and allow the resin to more effectively bond to the other nanoparticles used. POSS is particularly advantageous for use in helping a resin bond to a ceramic material.

The particulates of the present invention may comprise a filler material in addition to the nanoparticle material. Suitable filler materials include particles of micro or larger size. Suitable filler materials include any material that is compatible with the resin, the nanoparticle, and the chosen use for the final particulate. Generally, filler materials are selected to add low cost bulk to the particulate. Some suitable filler materials include metal oxides, fumed silica, microsphere materials, and combinations thereof. In some embodiments of the present method, the filler is present in an amount from about 20% to about 90% by weight of the mixture. In certain exemplary embodiments, the filler material is present in an amount from about 30% to about 60% by weight of the mixture.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a portion of a subterranean formation comprising:
   providing a nanocomposite particulate comprising at least one resin, at least one nanoparticle material, and a filler material of larger size than the nanoparticle material;
   substantially slurrying the nanocomposite particulate into a servicing fluid to create a slurry; and,
   placing the slurry into a well bore penetrating the portion of the subterranean formation.

2. The method of claim 1 wherein the resin is selected from the group consisting of a thermosetting resin, a thermoplastic resin, a cold settling resin, and a combination thereof.

3. The method of claim 1 wherein the resin is selected from the group consisting of an epoxy resin, a phenolic resin, a resole resin, a polyester resin, an epoxy-modified novolac resin, a furan resin, a melamine resin, an acrylic resin, and a combination thereof.

4. The method of claim 1 wherein the resin is selected from the group consisting of ethyl acrylate, methyl methacrylate, n-butyl methylacryate, and a combination thereof.

5. The method of claim 1 wherein the resin is selected from the group consisting of polyethylene, acrylonitrile-butadiene styrene, polystyrene, polyvinyl chloride, polyvinyl benzene, fluoroplastics, polysulfide, polypropylene, styrene acrylonitrile, nylon, phenylene oxide, polyvinylbenzene, polyolefins, polystyrene divinylbenzene, polyfluorocarbons, polyethers etherketones, polyamide imides, and a combination thereof.

6. The method of claim 1 wherein the resin is selected from the group consisting of an epoxy resin cured with an amine, an epoxy resin cured with an amine, a polyurethane resin cured with an amine, a polyurethane resin, an alkine modified resole resin cured with an ester, and a combination thereof.

7. The method of claim 1 wherein the nanocomposite particulate comprises from about 0.1% to about 30% nanoparticle material by weight of the nanocomposite particulate.

8. The method of claim 1 wherein the nanocomposite particulate comprises from about 1% to about 20% nanoparticle material by weight of the nanocomposite particulate.

9. The method of claim 1 wherein the nanoparticle material is selected from the group consisting of a nanoclay, a carbon nanofiber, a polyhedral oligomeric silsesquioxane (POSS), a carbon nanotube, a nanoparticle mineral, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, and a combination thereof.

10. The method of claim 1 wherein the filler material is selected from the group consisting of a metal oxide, a fumed silica, a microsphere material, and a combination thereof.

11. The method of claim 1 wherein the nanocomposite particulate comprises from about 20% to about 90% filler material by weight.

12. A method of fracturing a portion of a subterranean formation comprising:
    providing a nanocomposite particulate comprising at least one resin, at least one nanoparticle material, and a filler material of larger size than the nanoparticle material;
    substantially slurrying the nanocomposite particulate into a fracturing fluid to create a slurry; and,
    placing the slurry into a well bore penetrating the portion of the subterranean such that at least a portion of the nanocomposite particulates enter a fracture therein.

13. The method of claim 12 wherein the resin is selected from the group consisting of a thermosetting resin, a thermoplastic resin, a cold settling resin, and a combination thereof.

14. The method of claim 12 wherein the resin is selected from the group consisting of an epoxy resin, a phenolic resin, a resole resin, a polyester resin, an epoxy-modified novolac resin, a furan resin, a melamine resin, an acrylic resin, and a combination thereof.

15. The method of claim 12 wherein the resin is selected from the group consisting of ethyl acrylate, methyl methacrylate, n-butyl methylacryate, and a combination thereof.

16. The method of claim 12 wherein the resin is selected from the group consisting of polyethylene, acrylonitrile-butadiene styrene, polystyrene, polyvinyl chloride, polyvinyl benzene, fluoroplastics, polysulfide, polypropylene, styrene acrylonitrile, nylon, phenylene oxide, polyvinylbenzene, polyolefins, polystyrene divinylbenzene, polyfluorocarbons, polyethers etherketones, polyamide, imides, and a combination thereof.

17. The method of claim 12 wherein the resin is selected from the group consisting of an epoxy resin cured with an amine, an epoxy resin cured with an amine, a polyurethane resin cured with an amine, a polyurethane resin, an alkine modified resole resin cured with an ester, and a combination thereof.

18. The method of claim 12 wherein the nanocomposite particulate comprises from about 0.1% to about 30% nanoparticle material by weight of the nanocomposite particulate.

19. The method of claim 12 wherein the nanocomposite particulate comprises from about 1% to about 20% nanoparticle material by weight of the nanocomposite particulate.

20. The method of claim 12 wherein the nanoparticle material is selected from the group consisting of a nanoclay, a carbon nanofiber, a polyhedral oligomeric silsesquioxane (POSS), a carbon nanotube, a nanoparticle mineral, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, and a combination thereof.

21. The method of claim 12 wherein the filler material is selected from the group consisting of a metal oxide, a fumed silica, a microsphere material, and a combination thereof.

22. The method of claim 12 wherein the nanocomposite particulate comprises from about 20% to about 90% filler material by weight.

23. A method of gravel packing a portion of a well bore penetrating a portion of a subterranean formation comprising:
providing a nanocomposite particulate comprising at least one resin, at least one nanoparticle material, and a filler material of larger size than the nanoparticle material;
substantially slurrying the nanocomposite particulate into a servicing fluid to create a slurry; and,
introducing the slurry to the portion of the well bore such that at least a portion of the nanocomposite particulates form a gravel pack in or neighboring the portion of the well bore.

24. The method of claim 23 wherein the resin is selected from the group consisting of a thermosetting resin, a thermoplastic resin, a cold settling resin, and a combination thereof.

25. The method of claim 23 wherein the resin is selected from the group consisting of an epoxy resin, a phenolic resin, a resole resin, a polyester resin, an epoxy-modified novolac resin, a furan resin, a melamine resin, an acrylic resin, and a combination thereof.

26. The method of claim 23 wherein the resin is selected from the group consisting of ethyl acrylate, methyl methacrylate, n-butyl methylacryate, and a combination thereof.

27. The method of claim 23 wherein the resin is selected from the group consisting of polyethylene, acrylonitrile-butadiene styrene, polystyrene, polyvinyl chloride, polyvinyl benzene, fluoroplastics, polysulfide, polypropylene, styrene acrylonitrile, nylon, phenylene oxide, polyvinylbenzene, polyolefins, polystyrene divinylbenzene, polyfluorocarbons, polyethers etherketones, polyamide imides, and a combination thereof.

28. The method of claim 23 wherein the resin is selected from the group consisting of an epoxy resin cured with an amine, an epoxy resin cured with an amine, a polyurethane resin cured with an amine, a polyurethane resin, an alkine modified resole resin cured with an ester and a combination thereof.

29. The method of claim 23 wherein the nanocomposite particulate comprises from about 0.1% to about 30% nanoparticle material by weight of the nanocomposite particulate.

30. The method of claim 23 wherein the nanocomposite particulate comprises from about 1% to about 20% nanoparticle material by weight of the nanocomposite particulate.

31. The method of claim 23 wherein the nanoparticle is selected from the group consisting of a nanoclay, a carbon nanofiber, a polyhedral oligomeric silsesquioxane (POSS), a carbon nanotube, a nanoparticle mineral, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, and a combination thereof.

32. The method of claim 23 wherein the filler material is selected from the group consisting of a metal oxide, a fumed silica, a microsphere material, and a combination thereof.

33. The method of claim 23 wherein the nanocomposite particulate comprises from about 20% to about 90% filler material by weight.

* * * * *